United States Patent [19]
Mokdad et al.

[11] Patent Number: 4,590,412
[45] Date of Patent: May 20, 1986

[54] METHOD OF ENERGIZING A STEPPING MOTOR

[75] Inventors: Mohamed Mokdad, Bienne; Mai T. Xuan, Chavannes, both of Switzerland

[73] Assignee: Omega SA, Bienne, Switzerland

[21] Appl. No.: 649,338

[22] Filed: Sep. 11, 1984

[30] Foreign Application Priority Data

Sep. 16, 1983 [CH] Switzerland ........................ 5050/83

[51] Int. Cl.[4] ............................................. H02P 8/00

[52] U.S. Cl. .................................... 318/696; 318/685; 368/157

[58] Field of Search .................. 318/696, 685; 368/66, 368/157

[56] References Cited

U.S. PATENT DOCUMENTS

| | | | |
|---|---|---|---|
| 4,281,405 | 7/1981 | Besson et al. | 368/66 |
| 4,430,007 | 2/1984 | Wizet et al. | 368/157 |
| 4,439,717 | 3/1984 | Berney | 318/696 |

*Primary Examiner*—William M. Shoop, Jr.
*Assistant Examiner*—Saul M. Bergmann
*Attorney, Agent, or Firm*—Griffin, Branigan, & Butler

[57] ABSTRACT

A method of controlling a stepping motor comprises supplying the motor with a predetermined quantity of energy $E_{io}$ from whence there will result an automatic adaptation of the width of the motor drive pulse to the voltage $U_o$ at the motor terminals and the resistance $R_i$ of the energy source. At the moment when the internal energy $E_i(t)$ supplied to the motor, as defined by the integral over a time period of the product of $U_o-RI$ and the current $I_t$ circulating in the motor winding, becomes equal to $E_{io}$ the drive pulse is cut off (R is the resistance of the motor winding). The circuit for practicing the method according to the invention includes means for measuring the voltage $U_o$ and the energizing current I(t), means for obtaining the difference $U_o-RI$, a multiplier for forming the product $(U_o-RI)I(t)$ and an integrator the output of which provides a voltage proportional to the internal energy $E_i(t)$.

3 Claims, 4 Drawing Figures

METHOD OF ENERGIZING A STEPPING MOTOR

This invention concerns a method of energizing a stepping motor, particularly one adapted to timepiece use.

BACKGROUND OF THE INVENTION

In electronic timepieces currently found on the market it is usual to employ a stepping motor to convert electric impulses coming from a quartz time base into mechanical motion to display the time of day. The system is energized by an energy source, generally a battery of small dimensions, which must be periodically replaced. In order to spare the energy supplied by the battery, and thus to obtain the longest possible duration thereof, there have already been proposed regulating systems which slave the duration of the pulse driving the motor to the load which the motor must accommodate. In other words, the pulse is prolonged if the load increases and reduced if the load decreases. Such systems are described for instance in U.S. Pat. Nos. 4,323,834 and 4,346,463.

It is however necessary to distinguish among several types of loads acting on the rotor of the motor. Since a well defined angular position of the rotor is desired between steps it will be necessary to apply thereto a positioning rest couple which must be overcome each time that the rotor is to advance by a step. The rotor must likewise overcome various friction couples which are to be found in the bearings. Finally, the rotor will be required to supply a useful couple in order to drive the display mechanism. The energy to be supplied to the motor to overcome these different couples is generally well determined for a given type of watch which, when it operates normally, will consume a relatively constant amount of energy. Nevertheless, if the watch is provided with a calendar, it will be understood that once each 24 hours the useful couple to be supplied must be increased at the time of date change-over. It is then that slaving determined by the load may find use as mentioned hereinabove and of course in the situation where the watch is provided with a calendar or like system.

The slaving systems reacting to the imposed load on the rotor generally assume that the motor is energized at a constant voltage and do not take into account the variations between the voltage supplied by the battery at the beginning and then at the end of its life duration. At first glance this simplification may appear normal for a silver battery for which the voltages at the beginning and the end of life are respectively on the order of 1.6 and 1.4 volts. However, as will be seen, the difference indicated may lead already to an over-consumption by the system if measures are not taken in order to slave the length of the motor pulse to the voltage delivered by the energy source and likewise to the resistance presented by said source. It is evident on the other hand that if this difference increases still further as will be the case for instance in using lithium batteries, where the limits of operation may be fixed between 2.4 and 3.6 volts, the consumption in pure loss will be even greater.

There has come to our attention the European patent document EP No. 0 057 663 (corresponding to U.S. Pat. No. 4,439,717). This concerns a control arrangement for a stepping motor which sets out to avoid certain difficulties in the known arrangements arising from the fact that if the source voltage varies, the power supplied to the motor likewise varies, as set forth hereinabove. To relieve the difficulty the document suggests on the one hand energizing the motor with constant winding current and on the other hand analyzing the voltage signal present over the winding, then furnishing information on the voltage induced by the rotor movement.

The present invention is totally different inasmuch as no recourse is made to the induced voltage nor is there any necessity to maintain constant winding current. As will be subsequently seen the method now proposed is satisfied by measuring the energization voltage at the motor terminals and the winding current. The product of these quantities is integrated over a time period and the energy supply is cut off when the energy thus measured becomes equal to a predetermined quantity.

SUMMARY OF THE INVENTION

The purpose of this invention is thus to automatically adapt the drive pulse width to the voltage and the resistance of the energy source and such is effected by the method whereby the motor is supplied with a predetermined quantity of energy whereby there results an automatic adaptation of the width of the motor drive pulse. This may include the steps of determining an energy threshold $E_{io}$ to be supplied to the motor for which stepping is assured in all cases of normally occurring loads, measuring the voltage $U_o$ across the motor winding terminals and the current I(t) circulating in said winding, forming the difference $U_o - RI$ where R represents the winding resistance, forming the product $(U_o - RI)I(t)$, integrating said product over a time period t whereby the value of the integral represents the energy $E_i(t)$ supplied to the motor, comparing the measured value $E_i(t)$ to the predetermined threshold value $E_{io}$ and cutting off the energy supply when $E_i(t) = E_{io}$.

DETAILED DESCRIPTION OF THE INVENTION

Generally speaking, the currents and voltages appearing in the operation of the motor are given by the following electrical equation:

$$U_o = R \cdot I(t) + L(dI/dt) + U_i(t) \quad [1]$$

in which:

$U_o$ = voltage at the motor terminals;
$U_i$ = voltage induced by the motion
L = the self-inductance of the motor winding;
R = the resistance of the motor winding;
I = current in the motor winding.

By multiplying equation [1] by the term I(t)dt and integrating over a time period t, one obtains:

$$\int_o^t U_oI(t)dt = \int_o^t RI^2(t)dt + \int_o^t LI(t)dI + \int_o^t U_iI(t)dt \quad [2]$$

In this equation:

$\int_o^t U_oI(t)dt = E_t$ = total energy supplied to the system;

$\int_o^t RI^2(t)dt = E_{th}$ = energy dissipated by the Joule effect;

$\int_o^t LI(t)dI = E_s$ = energy stored by the self-inductance;

$\int_o^t U_iI(t)dt = E_m$ = mechanical energy supplied by the motor.

It is desired to supply the motor with a constant mechanical energy. Being given that $E_s$ is generally smaller than $E_m$ and almost constant, the fact of imposing $E_m$=a constant implies that $E_m+E_s$=constant. The sum $E_m+E_s$ is defined in the present case as representing the internal energy $E_i$ supplied to the motor. One may thus write:

$$E_i(t) = \int_o^t U_oI(t)dt - \int_o^t RI^2(t)dt \quad [3]$$

This signifies that the internal energy to be supplied to the motor is equal to the total energy supplied by the system ($E_t$) less the energy dissipated by the Joule effect ($E_{th}$).

From the equation [3] hereinabove, one may conclude that a value $E_i(t)$ exists for which one is assured that the rotor will accomplish its step, this value depending on the combination of a certain voltage $U_o$ at the terminals of the motor, a certain current I circulating in the winding and this during a predetermined time $T_i$. Let this value be $E_{io}$ which is expressed then by the equation $$E_{io} = \int_o^{T_i} U_oIdt - \int_o^{T_i} RI^2dt \quad [4]$$

This quantity of energy $E_{io}$ may be determined for each caliber of watch with which one may be concerned and it will play the role of a threshold in order to limit the duration or width of the drive pulse applied to the motor. In other words when the internal energy $E_i(t)$ supplied to the motor attains the threshold value $E_{io}$ the energy is cut off. One will thus have applied to the motor energy just sufficient to assure that the rotor accomplishes its step and have thus avoided useless over-consumption.

Figure 1:
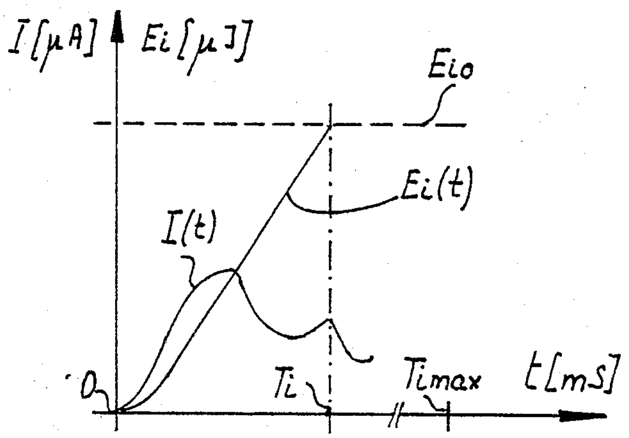
FIG. 1 is a graph illustrating the principle of energizing the stepping motor in accordance with the invention.

The method which has just been indicated is illustrated by the graph of FIG. 1. The abscissa thereof gives the integration time t in milliseconds and the ordinate the energy $E_i(t)$ in microjoules as well as energy value $E_{io}$ for which one is assured that the rotor will make its step. When the value $E_i(t)$ attains the threshold value $E_{io}$, the pulse is cut off, this giving a duration $T_i$ for such pulse. FIG. 1 shows also current variation in the winding of the motor. There has been shown on the time axis a value $t=T_i max$. Effectively it may happen for cases of load abnormally high that the energy $E_i(t)$ may never attain the threshold $E_{io}$. It is then preferable to limit in time the duration of the drive pulse, a duration which may be chosen to be relatively high. e.g. 10 ms.

Should one refer again to equation 4 it will be noted that if the voltage $U_o$ at the terminals of the motor diminishes (aging of the battery) it will be necessary to integrate over a longer time $T_i$ in order to attain the threshold value $E_{io}$, this corresponding to a prolongation of the drive pulse. In the same manner it will be noted that an increase of the internal resistance $R_i$ of the battery brings about a drop in $U_o$ and forces an increase of the duration $T_i$ of the pulse. Thus the method according to the invention effects a continuous regulation of the pulse width as a function of the variations of $U_o$ and consequently of $R_i$.

Figure 2:
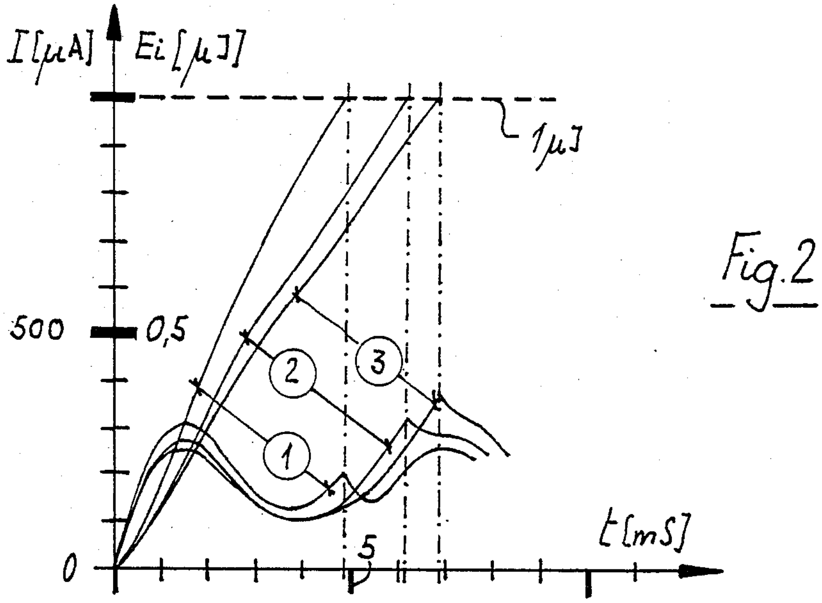
FIG. 2 is a graph which shows in greater detail how the width of the motor drive pulse varies when the voltage and the resistance of the energy source change if one employs the method in accordance with the invention.

FIG. 2 shows an example of simulation of the reaction of this slaving occasioned by a variation of voltage at the terminals of the motor or when the internal resistance of the battery varies. In this example, it is supposed that the minimum energy necessary $E_{io}$ to drive the motor is on the order of 1 μJ. In this graph there are to be found the same coordinates as those adopted in FIG. 1.

The curves of current I and energy $E_i$ referenced as 1 present a state in which the motor is energized by a voltage $U_o$ equal to 1.7 V (new battery). The length of the drive pulse is short, about 4.8 ms. The state referenced 2 is that for which the battery is at a discharge level for which the voltage $U_o$=1.5 V. The coincidence of $E_i$ and $E_{io}$ is achieved only when the pulse duration reaches 6.2 ms. Finally state 3 is shown for a voltage $U_o$=1.5 V and for a resistance value $R_i$ which has gone from 100Ω which was the case for states 1 and 2 to 500Ω. For this situation the drive pulse has a duration of 6.8 ms.

As a conclusion from what has been set forth and in accordance with this invention, it is seen that the motor is supplied with a predetermined quantity of energy from whence there will result an automatic adaptation of the drive pulse width $T_i$ to the voltage $U_o$ and the resistance $R_i$ of the energy source.

There will now be described means for putting into practice the method in accordance with the invention.

It provides in effect the measurement of the internal energy $E_i(t)$ supplied to the motor, comparing this internal energy to a predetermined quantity of energy $E_{io}$ for which one is assured that the motor will make its step in all cases of normal loads which may occur and cutting off the energization of the motor as soon as $E_i(t)=E_{io}$. The value of the internal energy $E_i(t)$ is known from the equation [3] from whence there results $$E_i(t) = \int_o^t (U_o - RI)Idt \quad [5]$$

Thus the value $U_o-RI$ is measured as well as the value of current I(t) circulating in the winding. The product of these two values will be obtained and integrated over a time period t.

The arrangement shown in the block diagram of FIG. 3 enables realization of all the operations mentioned hereinabove. The control block 4 receives at its input control pulses (timing) of a duration $T_i max$ and for which the width must be regulated, the energization voltage $U_o$, the predetermined quantity of energy $E_{io}$ and the energy supplied to the motor $E_i(t)$. The control 4 satisfies the following operating conditions: cut off the pulse if $E_i(t)$ becomes greater than $E_{io}$ or maintain it until a predetermined value $T_i$max in the case where $E_i(t)$ remains at all times less than $E_{io}$. Circuit 5 comprises sensing means which enable reading the current value I(t) in the motor winding 8 and the value of the voltage $U_o$ at the terminals and obtaining the difference $U_o-RI$. Circuit 6 is a multiplier which realizes the multiplying operation required in equation [5] mentioned hereinabove. Finally, circuit 7 in an integrator which integrates over the time duration the product $(U_o-RI)I(t)$ from whence there results the internal energy value $E_i(t)$.

Figure 3:
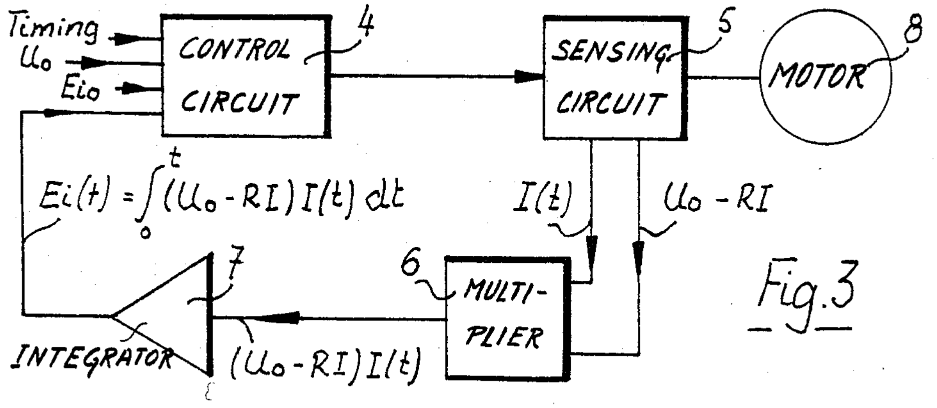
FIG. 3 is a block diagram of a basic electronic control circuit for practising the method according to the invention.

The block diagram of FIG. 3 shows the principle which permits the realization of the operations necessary to put into practice the method in accordance with the invention. As a practical matter, there exist various means of realization thereof and the diagram of FIG. 4 shows one possible arrangement which will now be explained.

Motor M is energized at its terminals by voltage $U_o$. The alternate polarity pulses are applied to the motor by a transistor bridge 31, 32, 33 and 34. When transistors 31 and 32 are conducting, the current circulates in the sense of arrow 35 while it circulates in the sense of arrow 36 when transistors 33 and 34 conduct. Between line 37 and earth is interposed an operational amplifier 38 at the output 42 of which appears a voltage proportional to the product of the resistance R of the winding and of the current I circulating therein. A second operational amplifier 39 combines via the three resistances r of equal value the voltage $U_o$ and the voltage R·I to supply at its output 40 a voltage $U_o-RI$. The voltages formed on lines 40 and 42 are sent respectively to inputs X and Y of a multiplier 43 which at its output 44 will deliver a voltage U proportional to $(U_o-RI)I(t)$ practically to a scale factor. This voltage U is applied to an integrator circuit composed of operational amplifier 45 to which is coupled a network formed by the resistance RM and the capacitor C. There will then be found at the output of the integrator on line 46 a voltage proportional to the value of the internal energy $E_i(t)$. It must as well be noted that a transistor 47 is connected in parallel across the capacitor C to short-circuit the capacitor as soon as the drive pulse has terminated (setting the integrator to zero). The control of transistor 47 is thus coupled by line 48 to the descending flank of the drive pulse.

Figure 4:
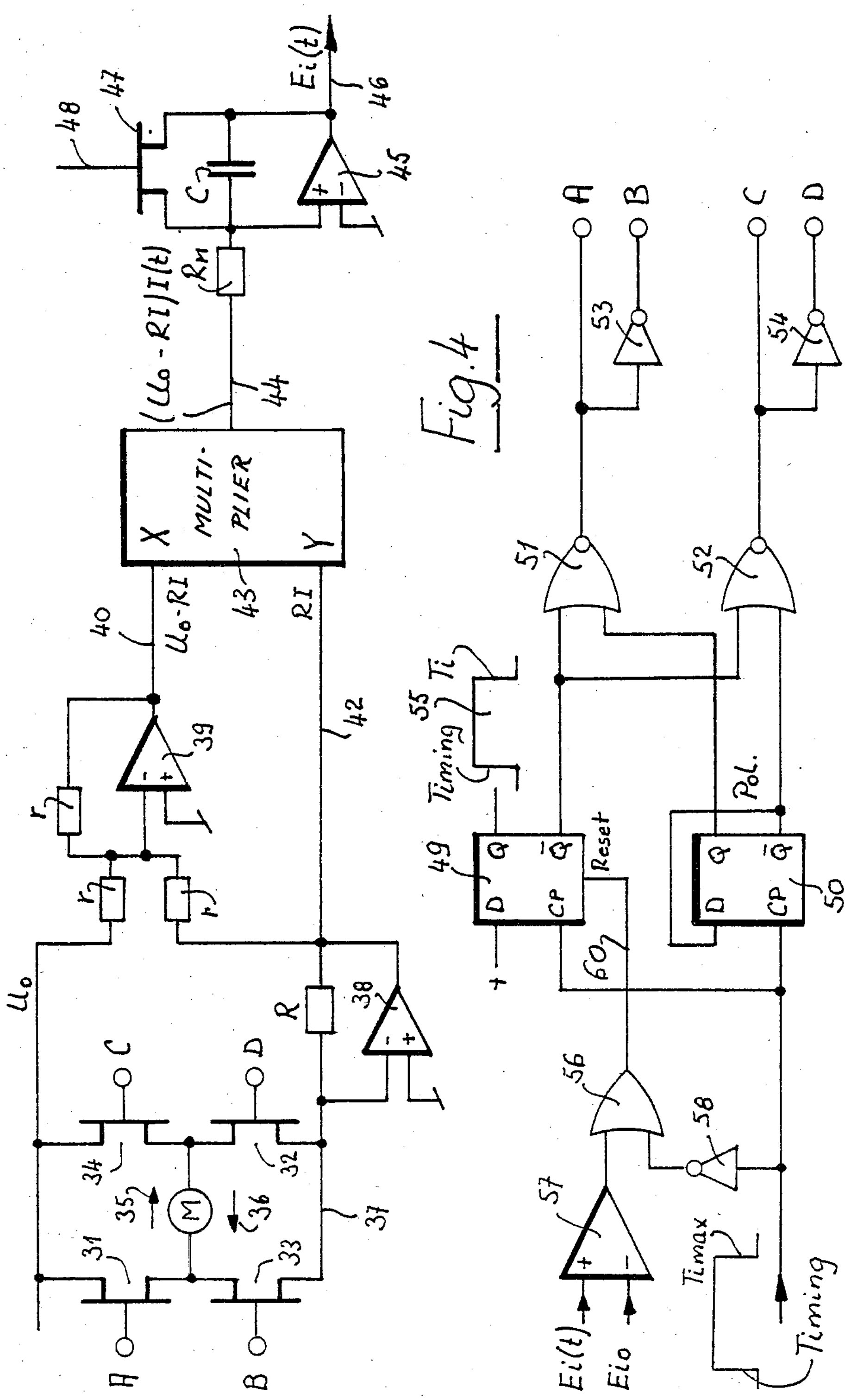
FIG. 4 is an example of one possible practical realization of the block circuit shown in FIG. 3.

FIG. 4 further shows two D type flip-flops 49 and 50 each receiving on their clock input CP control pulses (timing) supplied by the frequency divider (not shown) equipping the watch. These flip-flops change over on the rising flank of the pulse and furnish signals at their outputs Q and $\overline{Q}$ to two NOR-gates 51 and 52 and from there to two inverters 53 and 54 to provide finally signals A, B, C and D which control transistors 31, 33, 34 and 32 respectively. There will be found at the output Q of flip-flop 49 the control pulse 55 which begins with the rising flank (timing) and which ends as soon as the reset input of the same flip-flop is activated. On the output $\overline{Q}$ of this same flip-flop will be found the same pulse 55 but inverted. The flip-flop 50 has as its purpose to assure the alternating polarity of the control pulses.

The reset input of flip-flop 49 receives via line 60 and OR-gate 56 the signal coming from comparator 57. The inputs + and − of this comparator receive respectively the signals $E_i(t)$ mentioned hereinabove and $E_{io}$ which is a predetermined quantity of energy fixed initially and which depends on the type of watch to be controlled. $E_{io}$ is shown practically in the form of a stabilized voltage. At the moment where $E_i(t)=E_{io}$ and according to the invention, the comparator 57 supplies a signal 1 which via OR-gate 56 resets flip-flop 49 to zero and interrupts thus the motor drive pulse 55 (descending flank $T_i$).

Situations may arise however where $E_i(t)$ never attains $E_{io}$, for instance should an extraordinarily elevated couple be applied to the motor. In such case it will be understood that it is necessary to limit in time the duration of the drive pulse. In the schematic of FIG. 4 the control pulses (timing) appearing on the inputs CP of flip-flops 49 and 50 are limited in their duration to a maximum length $T_i$max. If no signal appears at the output of comparator 57, the descending flank of the control pulse, at time $T_i$max, will apply via inverter 58 and OR-gate 56, a reset signal to flip-flop 49, thus bringing about the interruption of the drive pulse at the output $\overline{Q}$ of the same flip-flop.

The circuit of FIG. 4 is realized by means of standard logic elements as far as the gates and inverters 51, 52, 53, 54, 56 and 58 are concerned as well as D-flip-flops 49 and 50. Multiplier 43 may be of the type AD 534 manufactured by Analog Devices. One may choose as operational amplifier 38, 39 and 45 those bearing the reference LF 355 N made by National Semiconductor. Comparator 57 may be of the type LM 311 of the same National Semiconductor.

To conclude, it will be noted that the method which has just been described does not react to a variation of load which may be presented at the motor shaft. It is consequently necessary to choose a value $E_{io}$ which is sufficiently elevated for the motor to be able to make its step in all circumstances. Thus if the slaving of the pulse width to the internal energy of the motor presents advantages which have been described herein, it will be understood nevertheless that such slaving will be insufficient if the motor should fail to make its step due to a momentary heavy overload or should lose a step following a shock. It may thus be useful to combine the slaving system according to this invention with a system which detects missed steps and recovers accumulated losses as described for instance in the published European patent application EP No. 0 022 270.

What we claim is:

1. A method of controlling the application of motor drive pulses having varying widths from an energy source having a changing internal resistance $R_i$ to a stepping motor, said method comprising the steps of:

determining an energy threshold $E_{io}$ to be supplied to the motor by a pulse for which stepping is assured in all cases of normally occurring loads;

continually measuring the instantaneous voltage $U_o$ across the motor winding terminals and the instantaneous current I(t) circulating in said winding during a pulse supplied by said energy source, the values of said instantaneous voltage $U_o$ and instantaneous current I(t) being dependent on the internal resistance $R_i$ of said energy source;

continually calculating the difference $U_o-RI$ where R represents the winding resistance during said pulse;

continually forming the product $(U_o-RI)$ I(t) during said pulse;

continually integrating said product over a time period t during said pulse whereby the value of the integral represents the energy $E_i(t)$ supplied to the motor;

continually comparing the measured value $E_i(t)$ during said pulse to the predetermined threshold value $E_{io}$; and, cutting off the energy supply when $E_i(t)=E_{io}$ to form the end of said pulse whereby the width of a motor drive pulse varies as the voltage $U_o$ and the resistance $R_i$ of the energy source vary to provide a predetermined quantity of energy equal to said energy threshold $E_{io}$ to the motor winding.

2. A method as set forth in claim 1 wherein the product $(U_o-RI)\ I(t)$ is integrated between two time limits, a first for which $t=0$ corresponding to the instant of application of the motor drive pulse and a second for which $t=T_i max$, $T_i max$ representing the maximum motor drive pulse width in a situation where the energy supplied to the motor is not sufficient to reach the predetermined energy.

3. A control circuit for controlling the application of motor drive pulses having varying widths from an energy source having a changing internal resistance $R_i$ to a stepping motor, said control circuit comprising:

first means for generating a signal representing an energy threshold $E_{io}$ to be supplied to the motor by a pulse for which stepping is assured in all cases of normally occurring loads;

second means for continuously measuring the instantaneous voltage $U_o$ across the motor winding terminals and the instantaneous current I(t) circulating in said winding during a pulse supplied by said energy source, the values of said instantaneous voltage $U_o$ and current I(t) being dependent on the internal resistance $R_i$ of said energy source;

third means responsive to said second means for continuously calculating the difference $U_o-RI$ where R represents the winding resistance during said pulse;

multiplier means responsive to said second means and said third means for continuously forming the product $(U_o-RI)\ I(t)$ during said pulse;

integrating means responsive to said multiplier means for continuously integrating said product over a time period t during said pulse whereby the value of the integral represents the energy $E_i(t)$ supplied to the motor; and, comparing means responsive to said first means and said integrating means for continuously comparing the measured value $E_i(t)$ during said pulse to the predetermined threshold value $E_{io}$;

said comparing means including further means for cutting off the energy supply when $E_i(t)=E_{io}$ to form the end of said pulse, whereby the width of a motor drive pulse varies as the voltage $U_o$ and the resistance $R_i$ of the energy source vary to provide a predetermined quantity of energy equal to said energy threshold $E_{io}$ to said motor.

* * * * *